May 8, 1956        C. F. CARTER        2,744,763
WHEEL-BARROW WITH PIVOTED SUPPORTING LEGS
Filed June 20, 1952        2 Sheets-Sheet 1
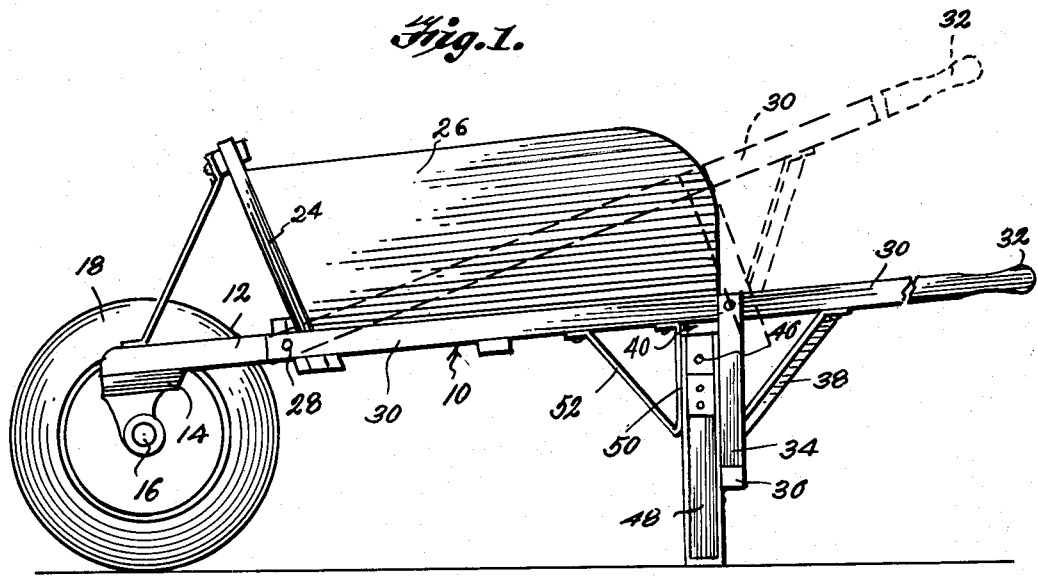
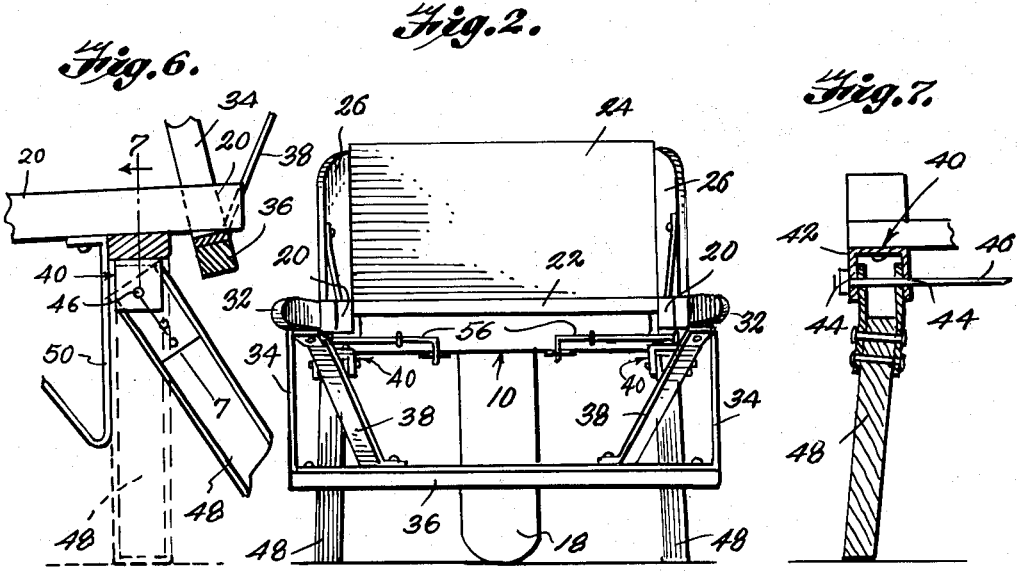 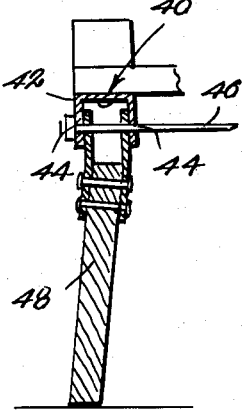
INVENTOR.
CECIL F. CARTER
BY *Patrick D. Beavers*
ATTORNEY May 8, 1956     C. F. CARTER     2,744,763
WHEEL-BARROW WITH PIVOTED SUPPORTING LEGS
Filed June 20, 1952     2 Sheets-Sheet 2
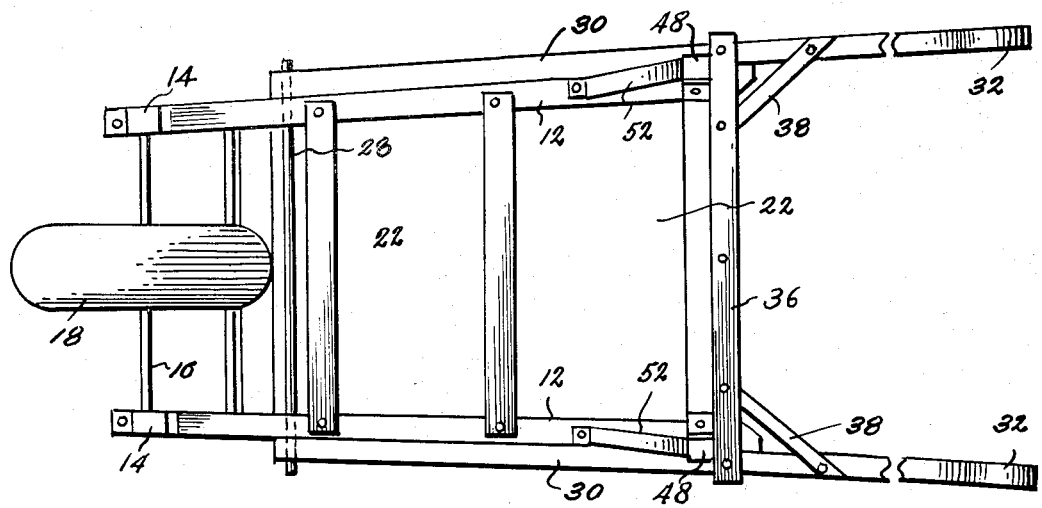
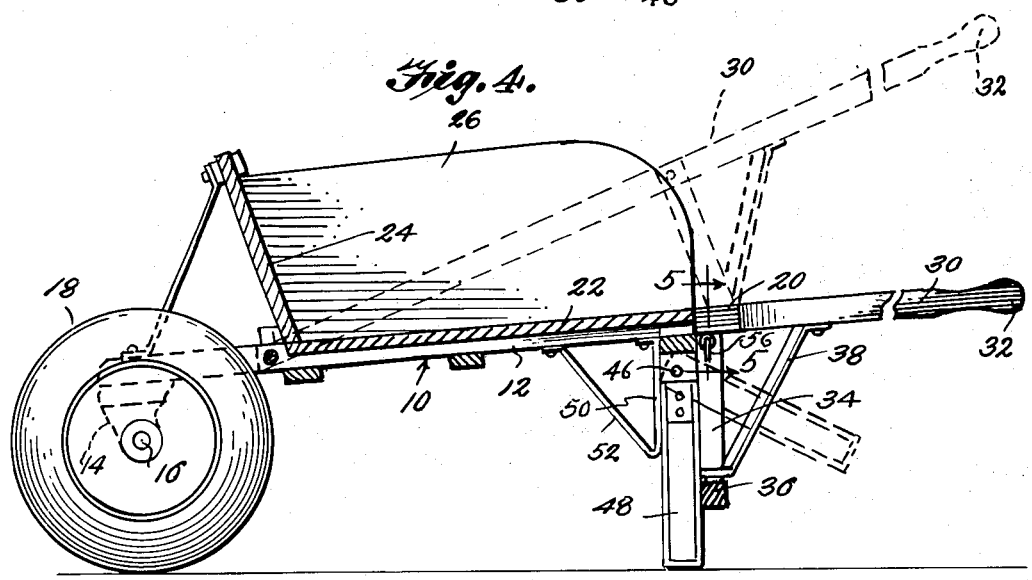
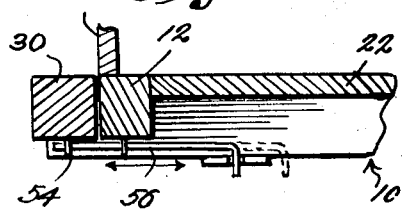
INVENTOR.
CECIL F. CARTER
BY *Patrick D. Beavers*
ATTORNEY United States Patent Office 2,744,763
Patented May 8, 1956

2,744,763

WHEEL-BARROW WITH PIVOTED SUPPORTING LEGS

Cecil F. Carter, Quogue, N. Y.

Application June 20, 1952, Serial No. 294,538

1 Claim. (Cl. 280—47.33)

This invention relates to a wheel barrow and has for its primary object to support a load in substantially horizontal position during the transportation thereof.

Another object is to lower the center of gravity of the load on the wheel barrow to relieve the user from strain during the transportation of the load.

A further object is to avoid the loss of the contents of the wheel barrow during transportation and to assure that a full load will be delivered to the destination.

Still another object is to avoid the tilting of the wheel barrow in order to surmount obstacles during the transportation of a load on the wheel barrow.

The above and other objects may be attained by employing this invention which embodies among its features a bed frame, a ground wheel carried by the bed frame adjacent one end thereof to rotate about an axis which extends substantially perpendicularly to the longitudinal axis of the bed frame, legs pivotally connected to and depending from the bed frame adjacent the end thereof remote from the ground wheel for movement about a common axis which extends transversely of the bed frame in vertical arcs which lie adjacent opposite sides of the bed frame and to the rear thereof, stops carried by the bed frame and depending therefrom between the ground wheel and the end of the bed frame remote therefrom for engaging the legs and holding them substantially vertical, handle bars pivoted to the bed frame intermediate the ends thereof and lift means carried by the handle bars and depending therefrom adjacent the end of the bed frame remote from the ground wheel for engaging said bed frame and lifting it when the handle bars are lifted, and said lift means depending from the handle bars for movement in a vertical arc which intersects the paths of movement of the legs to hold the legs against the stops when the handle bars are lowered.

Other features include means carried by the bed frame and engaging the handle bars to hold the handle bars against pivotal movement.

In the drawings:

Figure 1 is a side view of a wheel barrow embodying the features of this invention, Figure 2 is a rear end view of the wheel barrow illustrated in Figure 1, Figure 3 is a bottom plan view of the wheel barrow illustrated in Figure 1, Figure 4 is a longitudinal sectional view through the wheel barrow illustrated in Figure 1, Figure 5 is an enlarged fragmentary sectional view taken substantially on the line 5—5 of Figure 4, Figure 6 is a fragmentary enlarged detail sectional view illustrating the movement of one of the legs, and Figure 7 is a sectional view taken substantially on the line 7—7 of Figure 6.

Referring to the drawings in detail a bed frame designated generally 10 comprises spaced convergent side bars 12 carrying adjacent their convergent ends depending brackets 14 in which an axial shaft 16 is mounted. The axial shaft 16 extends across the frame 10 below the level thereof and mounted on the axial shaft 16 substantially midway between the side bars 12 is a ground wheel 18 which serves as the supporting means for the forward end of the wheel barrow during transportation thereof. The ends of the side bars 12 remote from those carrying the brackets 14 are extended as at 20 beyond the end of the frame remote from the wheel 18 to form stops, the purpose of which will hereinafter appear. Carried by the bed frame 10 and extending between the wheel and the stops 20 is a bed 22 carrying adjacent the wheel 18 an upwardly extending front panel 24, and demountably mounted on the bed 12 adjacent opposite sides thereof are upwardly extending panels 26.

Pivotally connected as at 28 to the side bars 12 adjacent the wheel 18 are handle bars 30 which are provided at ends remote from the pivot 28 with hand grips 32. Carried by the handle bars 30 and depending therefrom for movement in vertical arcuate paths adjacent the end of the bed frame 10 remote from the wheel 18 are arms 34 carrying at their lower ends a lift bar 36 which moves in a vertical arcuate path which intersects the extensions 20 of the side bars 12 so that as the handle bars 30 are moved upwardly about their pivot 28, beyond a predetermined point, the lift bar 36 will engage the extensions 20 and support the end of the bed frame 10 remote from the wheel 18. Suitable reinforcing brackets 38 are connected to the handle bars 30 between the arms 34 and the grips 32 and extend downwardly and forwardly as illustrated and are coupled to the lift bar 36 between the arms 34 and the longitudinal axis of the bed frame 10.

Carried by the side bars 12 of the bed frame 10 adjacent the extensions 20 are inverted U-shaped brackets designated generally 40 carrying depending flanges 42 having aligned openings 44 extending therethrough for the reception of a pivot shaft 46 which extends transversely across the bed frame 10 slightly below the underside thereof and to which is pivotally connected between each pair of depending flanges 42 a supporting leg 48 which as illustrated in the drawings are adapted to swing about a common horizontal axis in spaced vertical arcuate paths which extend beyond the end of the frame 10 remote from the wheel 18. Secured to and depending from each side bar 12 immediately adjacent each bracket 40 is a stop 50 which depends from its respective side bar in the path of movement of an adjacent leg 48 to arrest movement of said leg when it attains a vertical position with relation to the common axis of the pivot bar 46. A suitable bracing element 52 is carried by each stop 50 and connected to the adjacent side bar 12 to rigidly hold the stop in a vertical position.

As illustrated in Figure 1, when the handle bars 30 are in their lowermost position, the lift bar 36 extends transversely across the wheel-barrow below the bed frame 10 and engages the legs 48 to hold them against the stops 50 and in a position to support the end of the bed frame 10 remote from the wheel 18. When, however, lift is exerted on the grips 32 of the handle bars 30, the lift bar 36 will be moved upwardly to engage the extensions 20 of the side bars 14 and clear of the legs 48 so that as the wheel-barrow is moved to transport its load, the legs upon encountering an obstacle are free to swing about the common horizontal axis so as to clear the obstacle.

In order that the wheel-barrow may be employed in a conventional manner, each handle bar 30 is provided adjacent its respective arm 34 with an eye 54, and carried by an adjacent side bar 12 is a bolt 56 which is adapted to be moved transversely to project through the adjacent eye 54 and prevent movement of its respective handle bar about the pivot 28 thereof.

Obviously by employing a wheel-barrow constructed in accordance with this invention, the load carried thereby is supported at a much lower position than would be possible where the handle bars 30 rigidly coupled to the side bars of the bed frame and with the legs 48 mounted to move about a common transversely extending horizontal axis carried by the bed frame. It is obvious that any obstacle encountered in transporting a load on the wheel-barrow may be easily escaped as the legs 48 may swing about an horizontal axis and the user is relieved of any strain occasioned by the tilting of the wheel-barrow to permit a leg to escape an obstacle.

Having described the invention what is claimed as new is:

In a wheelbarrow including a bed frame, a supporting wheel carried by said frame at the forward end thereof, and a pair of vertically swingable handle bars pivoted at their forward ends to said bed frame, the provision of a transverse shaft carried by said frame in vertical spaced relation to the underside thereof, a pair of supporting legs each pivotally mounted at its upper end to one end portion of said shaft, whereby to be dependently swingable therefrom in a forward and rearward direction, a stop member affixed to the bottom of each side of said frame immediately forwardly of each of said legs and extending downwardly beyond the pivotal points of said legs whereby said legs abut against said stop members when in a vertical position, and a cross bar dependently carried by said handle bars in abutting relation to the rear sides of said legs when the latter are in a vertical position.

References Cited in the file of this patent

UNITED STATES PATENTS

| | | |
|---|---|---|
| 772,253 | Ray | Oct. 11, 1904 |
| 1,242,418 | Booth | Oct. 9, 1917 |
| 1,243,432 | Lemke | Oct. 16, 1917 |
| 1,485,179 | Funk | Feb. 26, 1924 |
| 1,823,816 | Chittenden | Sept. 15, 1931 |
| 2,598,261 | Hrabal | May 27, 1952 |

FOREIGN PATENTS

| | | |
|---|---|---|
| 567,459 | France | Dec. 7, 1923 |
| 140,742 | Great Britain | Nov. 18, 1920 |